J. F. BOYNTON.
Extracting Gold &c., from Ores.
No. 226,965. Patented April 27, 1880.
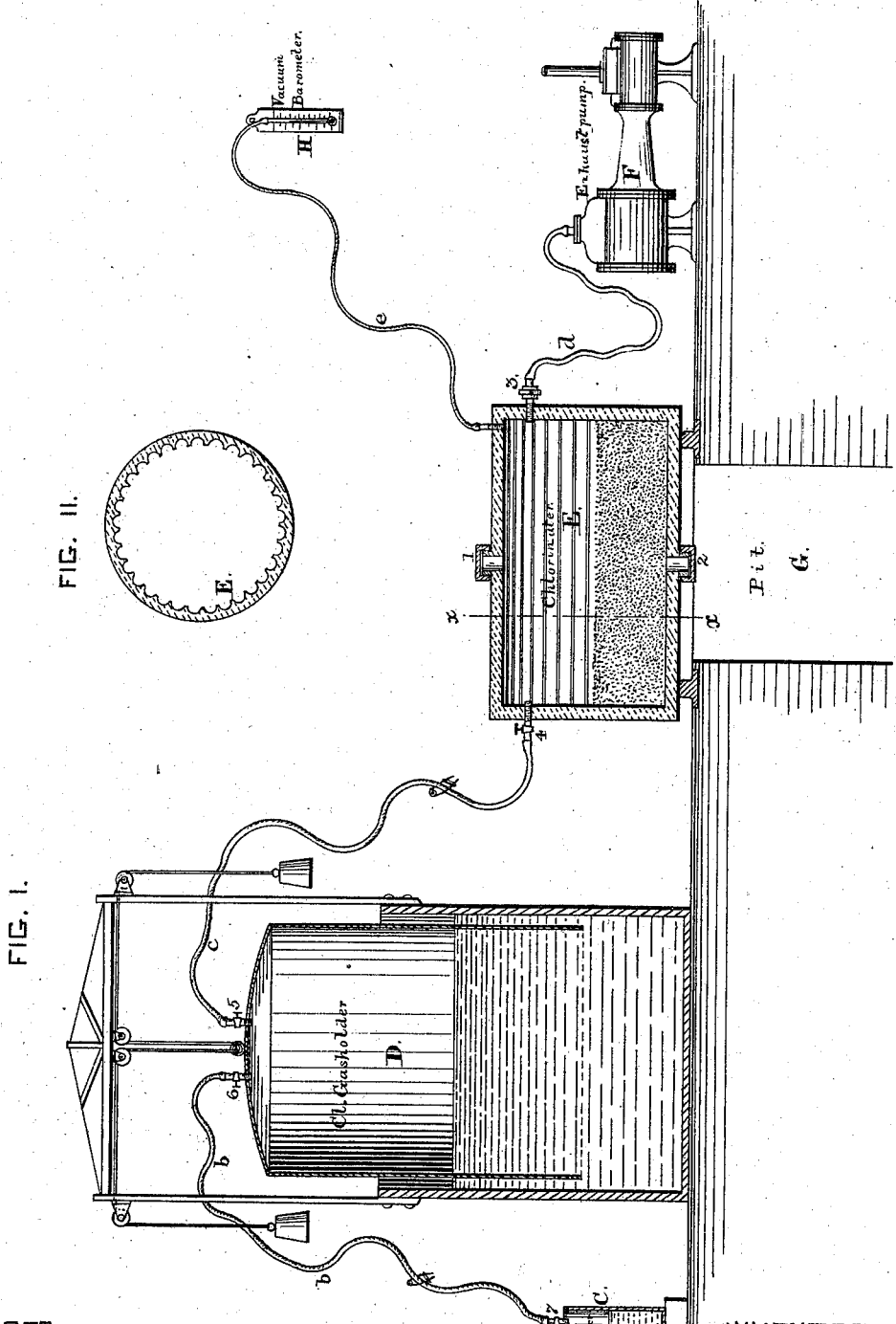

UNITED STATES PATENT OFFICE.

JOHN F. BOYNTON, OF SACO, MAINE.

EXTRACTING GOLD, &c., FROM ORES.

SPECIFICATION forming part of Letters Patent No. 226,965, dated April 27, 1880.

Application filed February 12, 1880.

*To all whom it may concern:*

Be it known that I, JOHN F. BOYNTON, a citizen of the United States, residing at Saco, in the county of York and State of Maine, have invented certain new and useful Improvements in the Process and Apparatus for Extracting Gold and other Metals from their Ores; and I do hereby declare that the following is a full, clear, and exact description of the invention, which will enable others skilled in the art to which it appertains to make and use the same.

This invention relates to improvements in extracting gold and other metals from their ores, compounds or mixtures, and other substances by what is known as the "chlorine process."

It is well known that chlorine will dissolve gold and other metals and form soluble chlorides, which can then be leached out, leaving substances not attacked by chlorine, and also such chlorides as are not soluble. This chlorine process has been often used, especially in making exact assays of gold ores and mixtures. It has also been applied as a working metallurgical method, but has been attended by many practical difficulties. If chlorine gas is used by any other ordinary method, its corrosive nature has very seriously interfered with its application. Of late years it has been applied in the shape of the so-called "chloride of lime," (bleaching-powder,) which, when mixed with ore, upon the addition of sulphuric acid, liberates chlorine, which dissolves the gold; or lime has been mixed with the ore and chlorine gas passed into the mixture under pressure, so as to dissolve the gold; or a solution of chlorine in water has been digested with the ore, so as to dissolve and leach out the gold as a chloride.

Now, my invention differs from all these; and it consists, first, in exhausting the air from the vessel containing the ore prior to admitting the chlorine in the form of gas; second, in preparing the gas and storing it in a gasometer or holder, so that it may be supplied as wanted to the vessels containing the ores; third, in devices for manipulating the ores in suitable vessels, so that the necessary connections may not be easily disarranged, so that the gas is not allowed to escape to interfere with the workmen, so that there may be no useless waste of materials, and so that a complete control of the operation be secured.

In the accompanying drawings, which show suitable apparatus for carrying out my invention, Figure 1 is a longitudinal section, partly in elevation; and Fig. 2, a cross-section in the line $x\,x$ of Fig. 1.

A B shows a chlorine-generator of ordinary construction, where, by a mixture of common salt (sodium chloride) and black oxide of manganese (manganese dioxide) and the addition of sulphuric-acid, chlorine gas may be produced. Any other compound capable of producing chlorine in sufficient quantity may be substituted.

The chlorine gas passes by pipe $a$ into vessel C, where it is washed in the ordinary way, and passes thence into the gas-holder D by pipe $b$. This holder is nicely balanced, so that it will rise and fall without pressure, or very slight pressure, on the holder and its connections.

The vessel E is for holding the ore while being treated, and may be called the "chlorinator." It is made very strong, so as to resist collapsing when exhausted of air, and is preferably made of stone or slate or any suitable material. It may be from three to six feet in length, in the form of a cylinder—say about three feet in diameter.

F shows an exhausting air-pump, of ordinary construction, connected with the chlorinator by pipe $d$ and coupling 3.

The chlorinator E is placed on rails or tramway, as shown, so as to be rolled from side to side, so that when the treatment is finished it may be rolled away to be emptied and replaced by other vessels. The chlorinator E may, if desired, serve as a leaching-tank.

The pit G serves for the workmen that handle the chlorinator.

H is a vacuum barometer or gage to show the degree of exhaustion connected with vessel E by pipe $c$ in said vessel.

The following is my way of using chlorine: Have a gas-holder like any other holder for burning city gas. Fill in any way as the gas is generated. When it is supplied and the holder is up, or partly so, let it balance on the weights, so that if the gas is sucked out the holder would descend by reason of the effective increase of external pressure due to the vacuum rather than by its own weight. This holder could stand ready for use. It may be made of lead varnished with paraffine or other varnish not acted on by chlorine. A tube is run from the holder to an apparatus, like an old soda-fountain, lined with lead, or may be made of stone or stoneware. In this vessel, which is called a "chlorinator" or "vacuum-chlorinator," the well-roasted ore, dry or damp, is put, and the air exhausted, so as to produce as perfect a vacuum as possible, by an air-pump, or by other means. By means of the pipe leading from the gas-holder the gas (chlorine) is allowed to enter slowly or rapidly, as occasion may require, into the chlorinator and mingle with the ore or metal to be operated on by the pure chlorine. The gas penetrates among the particles, fills the spaces or interstices, and acts on the particles, as well as on the surface of the pile of ore. The chlorinator is now tumbled or rolled so that the ore in it may be tumbled over itself or agitated while the chlorine is combining with the gold or other metals. As the chlorine enters into combination additional quantities are drawn into the chlorinator and exhausted from the holder. Since the gas combines with the metal of the ore, and is thereby condensed, the effect is produced by exhausting, not by pressure. By this means (exhausting) the chlorinator is free of all air, vapor, and gases, the surfaces of the particles of ore brought into perfect contact, and the most perfect action insured, as there are no other elements to conflict with the action of he chlorine. Chlorine being heavier than air and some other gases, it tends to remain on the ore at the bottom of the apparatus and not to escape. Now, when all action has stopped—that is, of the chlorine on the metal—a stream of water may be let into the chlorinator at the level of the ore, or beneath it, and thus raise the remaining chlorine out of the ore into the space above, and by filling the chlorinator with water the remaining gas can be driven back into the holder, raising it up in proportion to the quantity forced back; or the chlorine can be blown away by air simply by attaching a tube to a blacksmith's bellows or any other blower and blow air through the chlorinator and deliver the air and chlorine wherever desired. When chlorination is complete the ore is to be taken out, either wet or dry, and leached with water to take out the metallic chloride.

It will be seen that this invention obviates the use of strong tight pressure-cocks and packings, that must be used where pressure is exerted.

In my invention the whole operation is on the principle of vacuum rather than on pressure. Using an air-pump to exhaust the air and gas from the ore insures a clean, perfect contact for the chlorine.

There need be but little waste of gas. That which is not absorbed by the ore can be blown or forced back to the holder by the same pipe it came in by and to act on the other ore in another chlorinator. This would get rid of strong coupling, since all joints and pipes might be made of india-rubber and slipped onto the tubes without nuts and screws, no pressure being used.

I prefer to have all my tubs or vats for settling, filtering, &c., made of slabs of slate, sawed and worked at the slate-factory, ready to be set up at the mine.

I intend to make the generators of the gas or chlorinators of stone or slate where no pressure is required to occasion leaks or corrosion of joints.

I make my chlorine in the usual way from chloride of sodium, (common salt,) manganese dioxide, (black oxide of manganese,) and sulphuric acid, or by other substances. In this way of generating the gas in separate vessels, keeping it pure and apart from the ores, and using it, as wanted, pure, the gold chloride, when filtered, will be free from lime sulphate, as is not now the case, where the chloride of lime and sulphuric acid are used with the ore in the chlorinator under pressure.

Pressure and impurities are what I desire to get rid of. The use of chlorine under pressure is troublesome to the operator and corrosive to the apparatus employed.

My invention is a preventive against explosions arising from the chemical action of chlorine on nitrogen or nitrogenous compounds. It saves the use of strong and tight packing when pressure is used.

Air can be used as an agitator for stirring up the ore or sediments while chlorinating, washing, leaching, or filtering, it being, of course, removed as required in chlorinating.

My vacuum process removes all air or gas from the surface of the ore and allows the chlorine to come immediately in contact with clean surface of the metal, to act without having anything to cause conflicting action, such as vapor-water, carbonic acid, air, oxygen, nitrogen, or other gases, as must evidently be the case when chlorination is performed in other ways, and when chlorine compounds are decomposed by acids.

The quantity of chlorine used can be controlled by stopping the delivery of the chlorine gas, as may be indicated by the barometer, showing when the vacuum is partially or wholly supplied.

All the work of chlorination may be done in a partial vacuum, as the barometer will cease to indicate vacuum as chlorine is let in, and will indicate an increase in the vacuum as the metal or ore takes it up.

Having thus described my invention, what I claim, and desire to secure by Letters Patent of the United States, is—

1. The process herein described for extracting gold and other metals, consisting in exhausting or removing the air from the treating-vessel and supplying chlorine to replace the air and fill the vacuum created, substantially as set forth.

2. In apparatus for treating ores by the chlorine process, the combination of a chlorine-generator, a gas-holder, and a treating-vessel provided with means for freeing it from air, all substantially as set forth.

3. The combination of a chlorine-generator, a balanced gas-holder, a treating-vessel provided with an exhaust apparatus, and a pressure-gage, all substantially as set forth and described.

JOHN F. BOYNTON.

Witnesses:
 GEO. M. LOCKWOOD,
 A. MOORE.